(12) United States Patent
Qiu et al.

(10) Patent No.: US 10,519,366 B2
(45) Date of Patent: Dec. 31, 2019

(54) QUANTUM DOT ARTICLE WITH THIOL-EPOXY MATRIX

(71) Applicant: 3M INNOVATIVE PROPERTIES COMPANY, St. Paul, MN (US)

(72) Inventors: Zai-Ming Qiu, Woodbury, MN (US); Joseph M. Pieper, Atlanta, GA (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/560,597

(22) PCT Filed: Mar. 23, 2016

(86) PCT No.: PCT/US2016/023657
§ 371 (c)(1),
(2) Date: Sep. 22, 2017

(87) PCT Pub. No.: WO2016/167927
PCT Pub. Date: Oct. 20, 2016

(65) Prior Publication Data
US 2018/0057658 A1 Mar. 1, 2018

Related U.S. Application Data

(60) Provisional application No. 62/148,209, filed on Apr. 16, 2015.

(51) Int. Cl.
*C09K 11/02* (2006.01)
*C08K 3/08* (2006.01)
(Continued)

(52) U.S. Cl.
CPC ............... *C09K 11/02* (2013.01); *B32B 7/12* (2013.01); *B32B 27/08* (2013.01); *B32B 27/36* (2013.01);
(Continued)

(58) Field of Classification Search
CPC .......... C08K 3/08; C08K 3/30; C09K 11/883; C09K 11/025; C09K 11/70; C09K 11/02;
(Continued)

(56) References Cited

U.S. PATENT DOCUMENTS 3,018,262 A   1/1962   Schroeder
3,117,099 A   1/1964   Proops
(Continued)

FOREIGN PATENT DOCUMENTS

CN   104501043   4/2015
JP   2008-248169   10/2008
(Continued)

OTHER PUBLICATIONS

Cameron, "Base Catalysis in Imaging Materials. 1. Design and Synthesis of Novel Light-Sensitive Urethanes as Photoprecursors of Amines", Journal of Organic Chemistry, 1990, vol. 55, pp. 5919-5922.
(Continued)

*Primary Examiner* — Sophie Hon
(74) *Attorney, Agent, or Firm* — Kent S. Kokko; Lisa P. Fulton

(57) ABSTRACT

Described is a quantum dot film article comprising a quantum dot of a cured thiol-epoxy matrix. The matrix formulations resist ingress from water and/or oxygen, while also providing acceptable color stability upon aging.

7 Claims, 2 Drawing Sheets

(51) Int. Cl.

| | | |
|---|---|---|
| C09K 11/70 | (2006.01) | |
| C09K 11/88 | (2006.01) | |
| B32B 7/12 | (2006.01) | |
| B32B 27/08 | (2006.01) | |
| B32B 27/36 | (2006.01) | |
| C08K 3/30 | (2006.01) | |
| G02F 1/1335 | (2006.01) | |

(52) U.S. Cl.
CPC ............... *C08K 3/08* (2013.01); *C08K 3/30* (2013.01); *C09K 11/025* (2013.01); *C09K 11/70* (2013.01); *C09K 11/883* (2013.01); *G02F 1/133504* (2013.01); *B32B 2255/10* (2013.01); *B32B 2255/20* (2013.01); *B32B 2255/26* (2013.01); *B32B 2255/28* (2013.01); *B32B 2264/10* (2013.01); *B32B 2307/416* (2013.01); *B32B 2307/418* (2013.01); *B32B 2307/42* (2013.01); *B32B 2307/7244* (2013.01); *B32B 2307/7246* (2013.01); *B32B 2307/7265* (2013.01); *B32B 2457/202* (2013.01); *B32B 2551/00* (2013.01); *G02F 2001/133507* (2013.01); *G02F 2202/36* (2013.01)

(58) Field of Classification Search
CPC ............. B32B 2307/7244; C08L 63/00; G02F 2202/36
See application file for complete search history.

(56) References Cited

U.S. PATENT DOCUMENTS

| | | | |
|---|---|---|---|
| 3,708,296 A | | 1/1973 | Schlesinger |
| 3,759,871 A | * | 9/1973 | Hickner ............... C08G 75/045 528/109 |
| 4,017,554 A | * | 4/1977 | Villa ..................... C08L 63/00 525/523 |
| 4,069,055 A | | 1/1978 | Crivello |
| 4,216,288 A | | 8/1980 | Crivello |
| 4,250,311 A | | 2/1981 | Crivello |
| 4,279,717 A | | 7/1981 | Eckberg |
| 5,084,586 A | | 1/1992 | Farooq |
| 5,124,417 A | | 6/1992 | Farooq |
| 5,208,281 A | | 5/1993 | Glaser |
| 5,358,976 A | | 10/1994 | Dowling |
| 5,459,173 A | | 10/1995 | Glaser |
| 5,554,664 A | | 9/1996 | Lamanna |
| 5,650,261 A | | 7/1997 | Winkle |
| 5,753,346 A | | 5/1998 | Leir |
| 5,876,805 A | | 3/1999 | Ostlie |
| 6,153,719 A | | 11/2000 | Abbey |
| 6,645,341 B1 | * | 11/2003 | Gordon .................. C08G 59/18 156/330 |
| 7,018,713 B2 | | 3/2006 | Padiyath |
| 7,374,807 B2 | | 5/2008 | Parce |
| 7,645,397 B2 | | 1/2010 | Parce |
| 8,283,412 B2 | | 10/2012 | Liu |
| 8,343,575 B2 | | 1/2013 | Dubrow |
| 8,425,803 B2 | | 4/2013 | Parce |
| 8,592,037 B2 | | 11/2013 | Parce |
| 8,848,132 B2 | | 9/2014 | O'Neill |
| 9,199,842 B2 | | 12/2015 | Dubrow |
| 9,574,132 B2 | | 2/2017 | Qiu |
| 2002/0013449 A1 | | 1/2002 | Zook |
| 2004/0031967 A1 | * | 2/2004 | Fudeta .................... H01L 33/32 257/79 |
| 2005/0139852 A1 | * | 6/2005 | Chen ..................... B82Y 10/00 257/99 |
| 2005/0244975 A1 | | 11/2005 | Rakow |
| 2007/0112100 A1 | | 5/2007 | Byers |
| 2008/0113214 A1 | * | 5/2008 | Davis ................... C09K 11/565 428/690 |
| 2010/0279119 A1 | * | 11/2010 | Cleary ................... C09K 11/02 428/407 |
| 2013/0011551 A1 | * | 1/2013 | Zhou ................... C03C 23/0095 427/157 |
| 2013/0138251 A1 | | 5/2013 | Thogersen |
| 2013/0148057 A1 | | 6/2013 | Kang |
| 2013/0245204 A1 | * | 9/2013 | Pastine ................ C07D 295/13 525/409 |
| 2013/0313693 A1 | * | 11/2013 | Burns ................ C08G 59/4064 257/666 |
| 2013/0345458 A1 | | 12/2013 | Freeman |
| 2014/0071381 A1 | | 3/2014 | Jang |
| 2015/0083970 A1 | | 3/2015 | Koh |
| 2015/0098212 A1 | | 4/2015 | Won |
| 2016/0363713 A1 | | 12/2016 | Du Brow |
| 2017/0321116 A1 | | 11/2017 | Satake et al. |

FOREIGN PATENT DOCUMENTS

| | | |
|---|---|---|
| JP | 2016-141743 | 8/2016 |
| WO | WO 1996-35238 | 11/1996 |
| WO | WO 2007-015815 | 2/2007 |
| WO | WO 2010-141274 | 12/2010 |
| WO | WO 2012/059558 | 5/2012 |
| WO | WO 2014-024068 | 2/2014 |
| WO | WO 2014-113562 | 7/2014 |
| WO | WO 2015-095296 | 6/2015 |
| WO | WO 2016-003986 | 1/2016 |
| WO | WO 2016-081219 | 5/2016 |
| WO | WO 2016-167927 | 10/2016 |

OTHER PUBLICATIONS

Cameron, "Photogeneration of Organic Bases from o-Nitrobenzyl-Derived Carbamates", Journal of American Chemical Society, 1991, vol. 113, No. 11, pp. 4303-4313.

Frechet, "Photogenerated Amines and Diamines: Novel Curing Systems for Thin Film Coatings", Journal of Polymer Materials Science and Engineering, 1991, vol. 64, pp. 55-56.

Cole, "Redox Initiation of Bulk Thiol-ene Polymerizations", The Royal Society of Chemistry, Polymer Chemistry, 2013, vol. 4, pp. 1167-1175.

Crivello, "Epoxidized Triglycerides as Renewable Monomers in Photoinitiated Cationic Polymerization", Chemistry of Materials, 1992, vol. 4, pp. 692-699.

Dietliker, Chemistry and Technology of UV and EB Formulation for Coatings, Inks and Paints, 13pgs (1991).

Hoyle, "Thiol-Ene Click Chemistry", Angewandte Chemie International Edition, 2010, vol. 49, pp. 1540-1573.

Hoyle, "Thiol-Enes: Chemistry of the Past with Promise for the Future", Journal of Polymer Science: Part A: Polymer Chemistry, 2004, vol. 42 pp. 5301-5338.

Lee, Handbook of Epoxy Resins, 3pgs (1967).

Lubkowsha, "Aminoalkyl Functionalized Siloxanes", Polimery, 2014, vol. 59, pp. 763-768.

Othmer, Kirk-Othmer Encyclopedia of Chemical Technology, 253-255, (1998).

Quantaurus-QY Absolute PL Quantum Yield Spectrometer, Hamamatsu, [Retrieved from the internet on Oct. 30, 2017], <http://www.hamamatsu.com/us/en/product/alpha/P/5033/index.html>.

Shirai, "Photoacid and Photobase Generators: Chemistry and Applications to Polymeric Materials", Progress in Polymer Science, 1996, vol. 21, pp. 1-45, XP-002299394.

Tachi, "Photochemical Reactions of Quaternary Ammonium Dithiocarbamates as Photobase Generators and Their Use in the Photoinitiated Thermal Crosslinking of Poly(gycidylmethacrylate)", Journal of Polymer Science, Part A: Polymer Chemistry, 2001, vol. 39, pp. 1329-1341.

Zhu, "Synthesis and Optical Properties of Thiol Functionalized CdSe/ZnS (Core/Shell) Quantum Dots by Ligand Exchange", Journal of Nanomaterials, Mar. 2014, vol. 2014, pp. 1-14.

(56) References Cited

OTHER PUBLICATIONS

International Search Report for PCT International Application No. PCT/US2016/023657, dated May 20, 2016, 4pgs.

\* cited by examiner

QUANTUM DOT ARTICLE WITH THIOL-EPOXY MATRIX

CROSS REFERENCE TO RELATED APPLICATIONS

This application is a national stage filing under 35 U.S.C. 371 of PCT/US2016/023657, filed Mar. 23, 2016, which claims the benefit of U.S. Application No. 62/148,209, filed Apr. 16, 2015, the disclosure of which is incorporated by reference in its/their entirety herein.

BACKGROUND

Quantum Dot Enhancement Films (QDEF) are used for LCD displays. Red and green quantum dots are used in QDEF with a blue LED as the light source to give the full spectrum of colors. This has the advantage of improving the color gamut over the typical LCD display and keeping the energy consumption low compared to OLED or LED displays.

Quantum dot film articles include quantum dots dispersed in a matrix that is laminated between two barrier layers. The quantum dot articles, which include combinations of green and red quantum dots as fluorescing elements, can enhance color gamut performance when used in display devices such as, for example, liquid crystal displays (LCDs).

Quantum dots are highly sensitive to degradation, so the quantum dot article should have excellent barrier properties to prevent ingress of water and oxygen, which degrade the performance of the articles. Barrier layers protect the quantum dots in the interior regions of the laminate construction from damage caused by oxygen or water exposure, but the cut edges of the article expose the matrix materials to the atmosphere. In these edge regions the protection of the quantum dots dispersed in the matrix is primarily dependent on the barrier properties of the matrix itself.

If water and/or oxygen enter the edge regions of the quantum dot article, the quantum dots on or adjacent to the exposed edge of the laminate construction can degrade and ultimately fail to emit light when excited by ultraviolet or visible light. This type of quantum dot degradation, referred to as edge ingress, can cause a dark line around a cut edge of the film article, which can be detrimental to performance of a display in which the quantum dot article forms a part. Therefore, there is a need for matrix having better barrier properties for protection of quantum dots in QDEF from degradation for longer life stability.

SUMMARY

In general, the present disclosure is directed to matrix formulations for use in quantum dot articles. The matrix formulations resist ingress from water and/or oxygen, while also providing acceptable color stability upon aging. In one embodiment, the present disclosure is directed to a film article including a first barrier layer; a second barrier layer; and a quantum dot layer between the first barrier layer and the second barrier layer. The quantum dot layer includes quantum dots dispersed in a matrix of a cured thiol-epoxy resin.

More particularly, the thiol-epoxy matrix is the cured reaction product of a polythiol and an epoxy resin, each of which has a functionality of ≥2.

With the thiol-epoxy matrix, edge ingress of the converted parts is observed to not exceed 1 mm after 100+ hours of accelerated aging. In various embodiments, the matrix materials described in this disclosure limit the edge ingress after aging in 65° C. at 95% relative humidity or 85° C. conditions to less than 0.5 mm, and have a color change that does not exceed 0.02, or even 0.005, in both x and y from the initial measurement in the 1931 CIE coordinate system. These matrix formulations can extend the useful life of the quantum dot articles in display applications.

As used herein

"thiol-epoxy" refers to the reaction mixture of a polythiol and an epoxy resin, or the cured reaction product thereof.

"Alkyl" means a linear or branched, cyclic or acylic, saturated monovalent hydrocarbon.

"Alkylene" means a linear or branched unsaturated divalent hydrocarbon.

"Alkenyl" means a linear or branched unsaturated hydrocarbon.

"Aryl" means a monovalent aromatic, such as phenyl, naphthyl and the like.

"Arylene" means a polyvalent, aromatic, such as phenylene, naphthalene, and the like.

"Aralkylene" means a group defined above with an aryl group attached to the alkylene, e.g., benzyl, 1-naphthylethyl, and the like.

As used herein, "(hetero)hydrocarbyl" is inclusive of hydrocarbyl alkyl and aryl groups, and heterohydrocarbyl heteroalkyl and heteroaryl groups, the later comprising one or more catenary (in-chain) heteroatoms such as ether or amino groups. Heterohydrocarbyl may optionally contain one or more catenary (in-chain) functional groups including ester, amide, urea, urethane, and carbonate functional groups. Unless otherwise indicated, the non-polymeric (hetero)hydrocarbyl groups typically contain from 1 to 60 carbon atoms. Some examples of such heterohydrocarbyls as used herein include, but are not limited to, methoxy, ethoxy, propoxy, 4-diphenylaminobutyl, 2-(2'-phenoxyethoxy)ethyl, 3,6-dioxaheptyl, 3,6-dioxahexyl-6-phenyl, in addition to those described for "alkyl", "heteroalkyl", and "aryl" supra.

The term "composite particle" as used herein refers to a nanoparticle, which is typically in the form of a core/shell nanoparticle (preferably, nanocrystal), having any associated organic coating or other material on the surface of the nanoparticle that is not removed from the surface by ordinary solvation. Such composite particles are useful as "quantum dots," which have a tunable emission in the near ultraviolet (UV) to far infrared (IR) range as a result of the use of a semiconductor material.

The term "nanoparticle" refers to a particle having an average particle diameter in the range of 0.1 to 1000 nanometers such as in the range of 0.1 to 100 nanometers or in the range of 1 to 100 nanometers. The term "diameter" refers not only to the diameter of substantially spherical particles but also to the distance along the smallest axis of the structure. Suitable techniques for measuring the average particle diameter include, for example, scanning tunneling microscopy, light scattering, and transmission electron microscopy.

A "core" of a nanoparticle is understood to mean a nanoparticle (preferably, a nanocrystal) to which no shell has been applied or to the inner portion of a core/shell nanoparticle. A core of a nanoparticle can have a homogenous composition or its composition can vary with depth inside the core. Many materials are known and used in core nanoparticles, and many methods are known in the art for applying one or more shells to a core nanoparticle. The core has a different composition than the one more shells. The core typically has a different chemical composition than the shell of the core/shell nanoparticle.

As used herein, the term "actinic radiation" refers to radiation in any wavelength range of the electromagnetic spectrum. The actinic radiation is typically in the ultraviolet wavelength range, in the visible wavelength range, in the infrared wavelength range, or combinations thereof. Any suitable energy source known in the art can be used to provide the actinic radiation.

DETAILED DESCRIPTION

Figure 1:
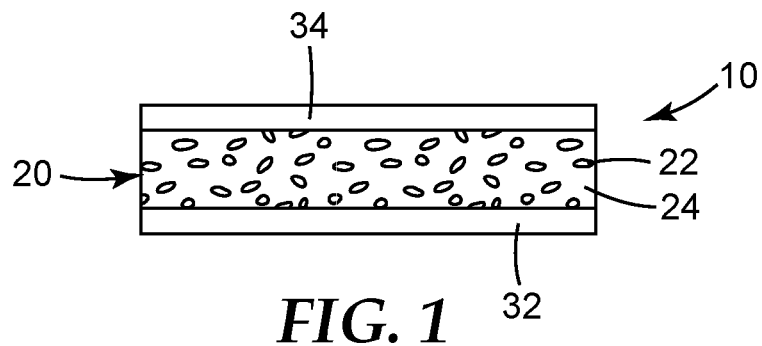
FIG. 1 is a schematic side elevation view of an edge region of an illustrative film article including quantum dots.

The present disclosure provides a novel composition comprising quantum dots dispersed in a thiol-epoxy polymer.

The present disclosure provides a quantum dot film article comprising a first barrier layer, a second barrier layer; and a quantum dot layer between the first barrier layer and the second barrier layer, the quantum dot layer comprising quantum dots dispersed in a matrix comprising a cured thiol-epoxy having a $T_g > 20°$ C.

The cured thiol-epoxy matrix or binder is the reaction product of a polythiol compound and an epoxy compound or resin wherein each has a functionality of ≥2. It will be understood that a limited amount of mono-epoxy compound has a functionality of 1 as the electrophilic epoxy group generates a nucleophilic hydroxy group on ring-opening, and the hydroxy group may then react with additional epoxy groups, but it is preferred that the epoxy resin has at least two epoxy groups.

The present disclosure provides a quantum dot film article comprising a first barrier film, a second barrier film; and a quantum dot layer between the first barrier film and the second barrier film, the quantum dot layer comprising quantum dots dispersed in a matrix comprising a cured thiol-epoxide having a $T_g > 20°$ C.

The polythiol reactant in the thiol-epoxy resin is of the formula:

$$R^2(SH)_y,\qquad\qquad\text{I}$$

where $R^2$ is (hetero)hydrocarbyl group having a valence of y, and y is ≥2, preferably >2. The thiol groups of the polythiols may be primary or secondary. The compounds of Formula I may include a mixture of compounds having an average functionality of two or greater.

$R^2$ includes any (hetero)hydrocarbyl groups, including aliphatic and aromatic polythiols. $R^2$ may optionally further include one or more functional groups including pendent hydroxyl, acid, ester, or cyano groups or catenary (in-chain) ether, urea, urethane and ester groups.

In one embodiment, $R^2$ comprises a non-polymeric aliphatic or cycloaliphatic moiety having from 1 to 30 carbon atoms. In another embodiment, $R^2$ is polymeric and comprises a polyoxyalkylene, polyester, polyolefin, polyacrylate, or polysiloxane polymer having pendent or terminal reactive —SH groups. Useful polymers include, for example, thiol-terminated polyethylenes or polypropylenes, and thiol-terminated poly(alkylene oxides).

Specific examples of useful polythiols include 2,3-dimercapto-1-propanol, 2-mercaptoethyl ether, 2-mercaptoethyl sulfide, 1,6-hexanedithiol, 1,8-octanedithiol, 1,8-dimercapto-3,6-dithiaoctane, propane-1,2,3-trithiol, and trithiocyanuric acid.

Another useful class of polythiols includes those obtained by esterification of a polyol with a terminally thiol-substituted carboxylic acid (or derivative thereof, such as esters or acyl halides) including α- or β-mercaptocarboxylic acids such as thioglycolic acid, β-mercaptopropionic acid, 2-mercaptobutyric acid, or esters therof.

Useful examples of commercially available compounds thus obtained include ethylene glycol bis(thioglycolate), pentaerythritol tetrakis(3-mercaptopropionate), dipentaerythritol hexakis(3-mercaptopropionate),ethylene glycol bis(3-mercaptopropionate), trimethylolpropane tris(thioglycolate), trimethylolpropane tris(3-mercaptopropionate), pentaerythritol tetrakis(thioglycolate), pentaerythritol tetrakis(3-mercaptopropionate), pentaerithrytol tetrakis (3-mercaptobutylate), and 1,4-bis 3-mercaptobutylyloxy butane, tris[2-(3-mercaptopropionyloxy)ethyl]isocyanurate, trimethylolpropane tris(mercaptoacetate), 2,4-bis(mercaptomethyl)-1, 3, 5,-triazine-2, 4-dithiol, 2, 3-di(2-mercaptoethyl) thio)-1-propanethiol, dimercaptodiethylsufide, and ethoxylated trimethylpropan-tri(3-mercaptopropionate).

A specific example of a polymeric polythiol is polypropylene ether glycol bis(3-mercaptopropionate) which is prepared by esterification of polypropylene-ether glycol (e.g., Pluracol™ P201, BASF Wyandotte Chemical Corp.) and 3-mercaptopropionic acid by esterification.

Useful soluble, high molecular weight thiols include polyethylene glycol di(2-mercaptoacetate), LP-3™ resins supplied by Morton Thiokol Inc. (Trenton, N.J.), and Permapol P3™ resins supplied by Products Research & Chemical Corp. (Glendale, Calif.) and compounds such as the adduct of 2-mercaptoethylamine and caprolactam.

Preferred polythiols include the following:

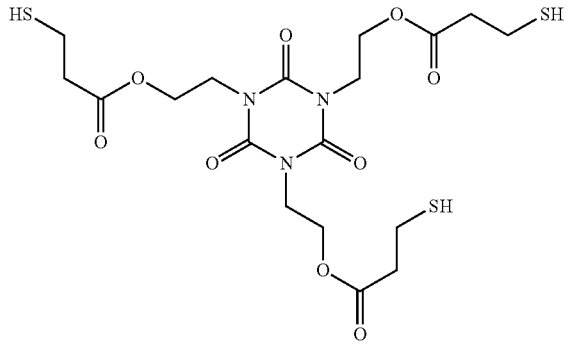

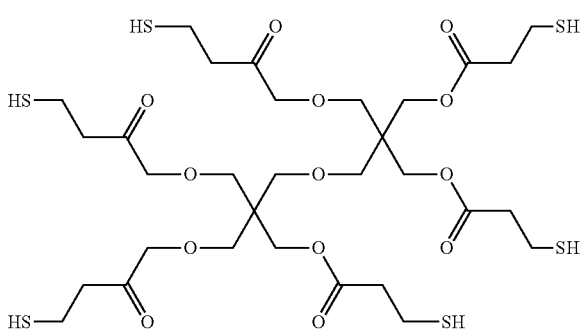

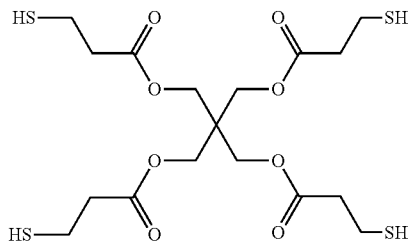
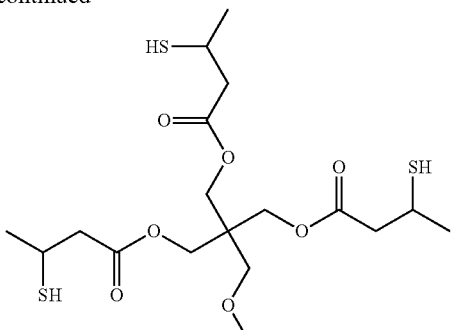
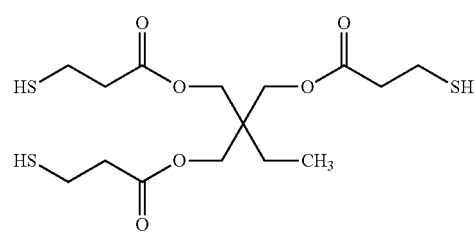
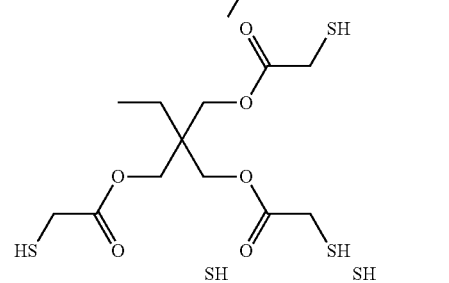
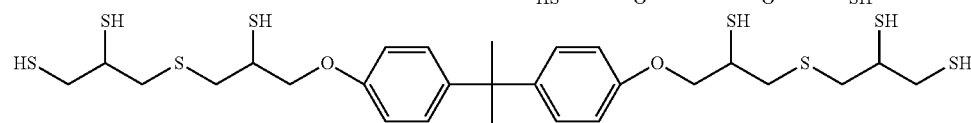
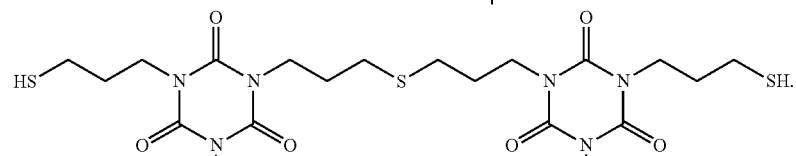
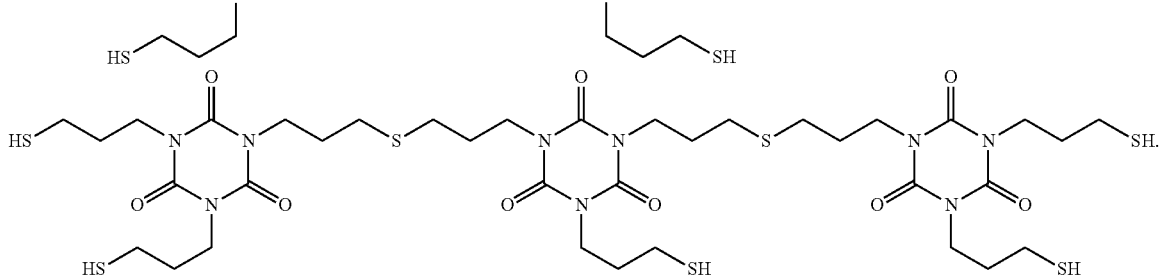

The composition further comprises an epoxy resin. Suitable epoxy resins include monomeric or oligomeric epoxy compounds that can be aliphatic, alicyclic, aromatic, or heterocyclic. These materials generally have, on the average, ≥1 polymerizable epoxy group per molecule. Preferably the epoxy resins have ≥1.5 or ≥2 polymerizable epoxy groups per molecule. The oligomeric epoxides can be linear oligomers having terminal epoxy groups (for example, a diglycidyl ether of a polyoxyalkylene glycol), oligomers having skeletal epoxy units (for example, polybutadiene polyepoxide), or oligomers having pendant epoxy groups (for example, a glycidyl methacrylate oligomer or co-oligomer). The epoxides can be pure compounds or can be mixtures of compounds containing one, two, or more epoxy groups per molecule. These epoxy-containing materials can have a backbone of any type and with any suitable substituent group thereon that does not substantially interfere with cure. Illustrative of permissible substituent groups include halogens, ester groups, ethers, sulfonate groups, siloxane groups, nitro groups, phosphate groups, and the like. The average molecular weight of the epoxy-containing materials can vary from about 58 g/mole to about 1000 g/mole or more.

Useful epoxy resins include glycidyl ether compounds of Formula IV

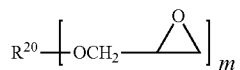

where $R^{20}$ is (hetero)hydrocarbyl group having a valence of m, and m is ≥2, preferably >2. The compounds of Formula IV may include a mixture of compounds having an average functionality of two or greater.

$R^{20}$ includes any (hetero)hydrocarbyl groups, including aliphatic and aromatic polythiols. $R^{20}$ may optionally further include one or more functional groups including pendent hydroxyl, amide, ester, or cyano groups or catenary (in-chain) ether, urea, urethane, ester groups, amides, thioethers, functional groups In one embodiment, $R^{20}$ comprises a non-polymeric aliphatic or cycloaliphatic moiety having from 1 to 30 carbon atoms. In another embodiment, $R^{20}$ is polymeric and comprises a polyoxyalkylene, polyester, polyolefin, polyacrylate, or polysiloxane polymer having pendent or terminal reactive epoxy groups. Useful polymers include, for example, epoxy-terminated polyethylenes or polypropylenes, and epoxy-terminated poly(alkylene oxides).

Exemplary epoxides are glycidyl ethers of polyhydric phenols that can be obtained by reacting a polyhydric phenol with an excess of a chlorohydrin such as epichlorohydrin (for example, the diglycidyl ether of 2,2-bis-(2,3-epoxypropoxyphenol)-propane). Additional examples of epoxides of this type are described in U.S. Pat. No. 3,018,262, and in Handbook of Epoxy Resins, Lee and Neville, McGraw-Hill Book Co., New York (1967).

Numerous commercially available epoxy resins can be utilized. In particular, epoxides that are readily available include resins of octadecylene oxide, epichlorohydrin, styrene oxide, vinyl cyclohexene oxide, glycidol, glycidyl methacrylate, diglycidyl ethers of Bisphenol A (for example, EPON 828, EPON 825, EPON 1004, and EPON 1001 from Momentive Specialty Chemicals) as well as DER 221, DER 332, and DER 334 from Dow Chemical Co., Midland, Mich.), vinylcyclohexene dioxide (for example, ERL 4206 from Union Carbide), 3,4-epoxycyclohexylmethyl-3,4-epoxycyclohexene carboxylate (for example, ERL 4221, CYRACURE UVR 6110, and CYRACURE UVR 6105 from Union Carbide), 3,4-epoxy-6-methylcyclohexylmethyl-3,4-epoxy-6-methyl-cyclohexene carboxylate (for example, ERL 4201 from Union Carbide), bis(3,4-epoxy-6-methylcyclohexylmethyl) adipate (for example, ERL 4289), bis(2,3-epoxycyclopentyl) ether (for example, ERL 0400), aliphatic epoxy modified from polypropylene glycol (for example, ERL 4050 and ERL 4052), dipentene dioxide (for example, ERL 4269), epoxidized polybutadiene (for example, OXIRON 2001 from FMC Corp.), silicone resin containing epoxy functionality, flame retardant epoxy resins such as brominated bisphenol-type epoxy resins (for example, DER 580), 1,4-butanediol diglycidyl ether of phenol formaldehyde novolak (for example, DEN 431 and DEN 438 from Dow Chemical), resorcinol diglycidyl ether (for example, KOPDXITE from Koppers Company, Inc.), bis(3,4-epoxycyclohexylmethyl)adipate (for example, ERL 4299 or CYRACURE UVR 6128), 2-(3,4-epoxycyclohexyl-5,5-spiro-3,4-epoxy) cyclohexane-meta-dioxane (for example, ERL-4234), vinylcyclohexene monoxide, 1,2-epoxyhexadecane (for example, CYRACURE UVR-6216), alkyl glycidyl ethers such as alkyl Cs—C 10 glycidyl ether (for example, HELOXY MODIFIER 7 from Resolution Performance Products), alkyl $C_{12}$-C14 glycidyl ether (for example, HELOXY MODIFIER 8 from Momentive Specialty Chemicals), butyl glycidyl ether (for example, HELOXY MODIFIER 61 from), cresyl glycidyl ether (for example, HELOXY MODIFIER 62), p-tert-butylphenyl glycidyl ether (for example, HELOXY MODIFIER 65), polyfunctional glycidyl ethers such as diglycidyl ether of 1,4-butanediol (for example, HELOXY MODIFIER 67), diglycidyl ether of neopentyl glycol (for example, HELOXY MODIFIER 68), diglycidyl ether of cyclohexanedimethanol (for example, HELOXY MODIFIER 107), trimethylol ethane triglycidyl ether (for example, HELOXY MODIFIER 44), trimethylol propane triglycidyl ether (for example, HELOXY 48), polyglycidyl ether of an aliphatic polyol (for example, HELOXY MODIFIER 84), polyglycol diepoxide (for example, HELOXY MODIFIER 32), bisphenol F epoxides (for example, EPON 862 and Araldite GY-281 from Huntsman Advanced Materials), and 9,9-bis[4-(2,3-epoxypropoxy)-phenylfluorenone (for example, EPON 1079 from Momentive Specialty Chemicals).

Other useful epoxy-containing materials include those that contain cyclohexene oxide groups such as epoxycyclohexanecarboxylates, typified by 3,4-epoxycyclohexylmethyl-3,4-epoxycyclohexanecarboxylate, 3,4-epoxy-2-methylcyclohexylmethyl-3,4-epoxy-2-methylcyclohexane carboxylate, and bis(3,4-epoxy-6-methylcyclohexylmethyl) adipate. A more detailed list of useful epoxides of this nature is set forth in U.S. Pat. No. 3,117,099 (Proops et al).

Other useful epoxy resins are well known and contain such epoxides as epichlorohydrins, alkylene oxides (for example, propylene oxide), styrene oxide, alkenyl oxides (for example, butadiene oxide), and glycidyl esters (for example, ethyl glycidate). Still other useful epoxy resins include epoxy-functional silicones such as those described in U.S. Pat. No. 4,279,717 (Eckberg et al.), which are commercially available from the General Electric Company. These epoxy resins are polydimethylsiloxanes in which 1 to 20 mole percent of the silicon atoms have been substituted with epoxyalkyl groups (preferably, epoxy cyclohexylethyl, as described in U.S. Pat. No. 5,753,346 (Leir et al.)).

Blends of various epoxy-containing materials can also be utilized. Suitable blends can include two or more weight average molecular weight distributions of epoxy-containing compounds such as low molecular weight epoxides (e.g., having a weight average molecular weight below 200 g/mole), intermediate molecular weight epoxides (e.g., having a weight average molecular weight in the range of about 200 to 1000 g/mole), and higher molecular weight epoxides (e.g., having a weight average molecular weight above about 1000 g/mole). Alternatively or additionally, the epoxy resin can contain a blend of epoxy-containing materials having different chemical natures such as aliphatic and aromatic or different functionalities such as polar and non-polar.

Preferred epoxy resins include the following:

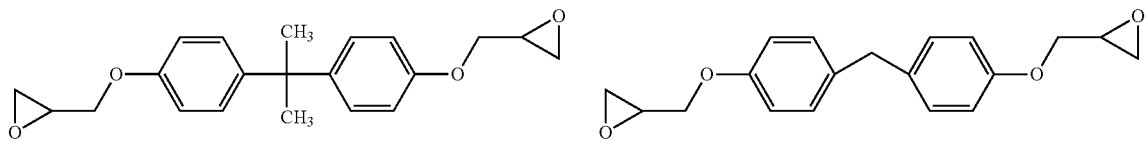

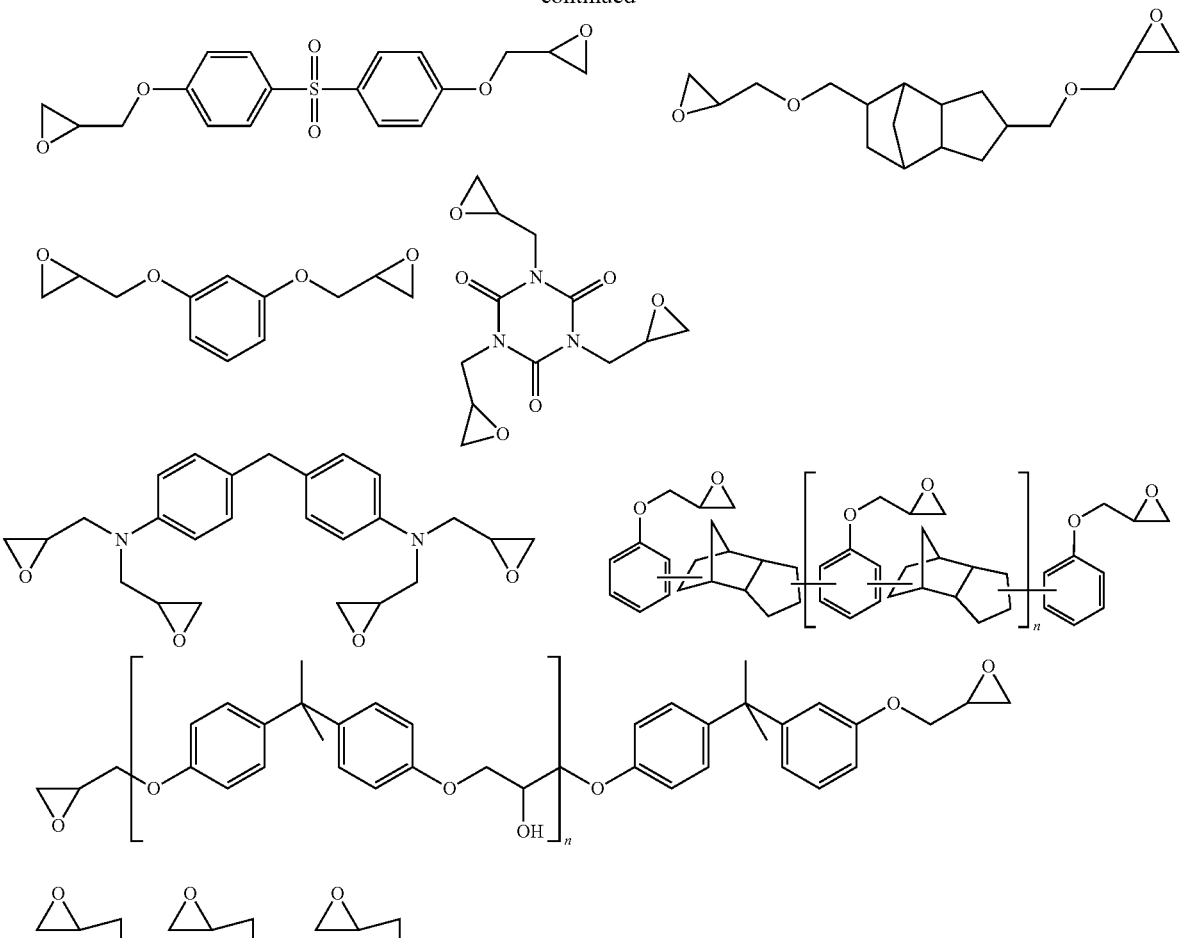

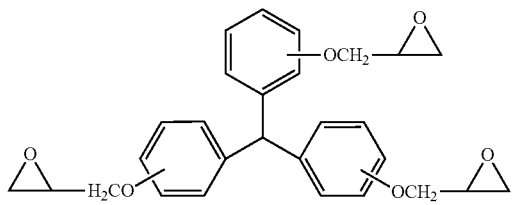

R = alkylene

R = H, CH₃

In some preferred embodiments, the polyepoxy and/or the polythiol compounds are oligomeric and prepared by reaction of the two with one in excess. The pre-reacted higher molecular weight thiol-epoxy oligomer (epoxy or thiol functional) may help to reduce the exothermic heat during final curing.

For example, polythiols of Formula I may be reacted with an excess of polyepoxides of Formula IV such that an oligomeric polyepoxy results having a functionality of at least two. Conversely an excess of polythiols of Formula I may be reacted with the polyalkenes of Formula II such that an oligomeric polythiol results having a functionality of at least two. The oligomeric polyepoxides and polythiols may be represented by the following formulas, where subscript z is two or greater. $R^2$ and $R^{20}$ are as previously defined. A linear thiol-epoxy polymer is shown for simplicity; i.e. subscripts y and m are 2. As will be understood, the $R^2$ group may be further substituted with additional thiol groups and the $R^{20}$ group may be substituted with additional epoxy groups. Subscript z is at least two. It will be understood that the Markonikov addition of the thiol to the epoxide is shown, but either Markonikov or anti-Markonikov is contemplated.

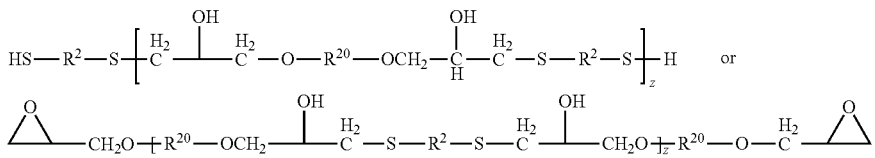

The components are generally used in approximately 1:1 molar amounts of thiol groups to epoxy groups +/−20%. Therefore, the molar ratio of thiol groups of the polythiol to the epoxy groups of the epoxy resin will be from 0.75:1 to 1:0.75, preferably 0.9:1 to 1:0.9.

In some embodiments a limited amount of (meth)acrylates may be used in the matrix binder composition, which may be cured with polythiol via Michael addition reaction or radical reaction.

Useful methacrylate compounds have barrier properties to minimize the ingress of water and/or oxygen. In some embodiments, methacrylate compounds with a glass transition temperature ($T_g$) of greater than about 100° C. and substituents capable of forming high crosslink densities can provide a matrix with improved gas and water vapor barrier properties. In some embodiments, the methacrylate compound is multifunctional, and suitable examples include, but are not limited to, those available under the trade designations SR 348 (ethoxylated (2) bisphenol A di(meth)acrylate), SR540 (ethoxylated (4) bisphenol A di(meth)acrylate), SR444 (pentaerythritol triacrylate), SR351 (trimethacrylolpropane triacrylate), SR368 (tris(2-hydroxy ethyl)isocyanurate triacrylate), SR833s(tricyclodecane dimethanol diacrylate) and SR239 (1,6-hexane diol di(meth)acrylate) from Sartomer USA, LLC, Exton, Pa.

The (meth)acrylate compound forms about 0 wt. % to about 25 wt. %, or about 5 wt. % to about 25 wt. % or about 10 wt. % to about 20 wt. %, of the matrix composition.

In embodiments where the thiol-epoxy polymer composition further comprises an (meth)acrylate component, the molar functional group equivalent of (meth)acrylate plus the molar equivalent of epoxy groups is equal to the thiol equivalents +/−20%.

The thiol-epoxy resin may be prepared by combining the polythiol and epoxy resin in suitable ratios and then cured using a base or acid catalyst. The base or acid catalyst may be a photoacid or photobase catalyst.

The epoxy-thiol resin component is thermally cured using a base or acid catalyst. The catalyst may be a photocatalyst, including photoacid or photobase generators. In general, if the quantum dots are amine ligand stabilized, an amine catalyst for the epoxy is preferred. Similarly, if the quantum dots are acid-stabilized, acid catalysts are preferred. In some embodiment, the acid or base ligand or acid-/base-functional liquid carrier in stabilizing the quantum dots may act as the catalyst for the curing of polythiol and epoxy resin. Tertiary amines are among the preferred base catalysts. The curing can be controlled by different kind of catalysts, the amount of catalyst as well as the curing temperature.

The amine catalyst is used for the deprotonation of thiol (—SH) to thiolate (—S⁻) which reacts with epoxy group by nucleophilic ring opening polymerization. An amine catalyst can include one or more from the group: a cyclic amidine; a tertiary amine; a secondary amine; a substituted cyclic amidine, substituted tertiary amine, substituted secondary amine; or a combination thereof. The catalyst can comprise one or more of imidazole, imidazoline, pyrrolidine, a substituted imidazole compound, a substituted imidazoline compound, 1,4,5,6-tetrahydropyrimidine, a substituted 1,4,5,6-tetrahydropyrimidine compound, a substituted pyrrolidine compound, a substituted piperidine compound, and combinations thereof. The catalyst can also comprise an unsubstituted piperidine, an acyclic amidine or a substituted acyclic amidine. Examples of acyclic amidines that may be acceptable catalysts according to the present invention include NN'-dialkylalkylamidines, such as N,N'-dimethylalkylamidine and NN'-diethylmethylamidine.

A polyfunctional or multifunctional amine (e.g., a diamine containing both primary and secondary functionality or multiple primary functionality) will cause chain extending and cross linking (i.e., will function as a curing agent). Even though it will cause cross linking to occur, a polyfunctional amine or other curing agent may be used, but in a limited amount.

The amine catalyst for the epoxy resin may be selected from a photobase generator. On exposure to UV radiation, the photobase generator releases an amine, which catalyzes the addition of the thiol to the epoxy.

Photobase generators useful in the present invention are any compounds which liberate base upon exposure to light, typically at a wavelength of about 320 to 420 nanometers, however other wavelengths may be suitable. Suitable photobase generators include, but are not limited to: benzyl carbamates, benzoin carbamates, o-carbamoylhydroxyamines, O-carbamoyloximes, aromatic sulfonamides, alpha-lactams, N-(2-allylethenyl)amides, arylazide compounds, N-arylformamides, and 4-(ortho-nitrophenyl)dihydropyridines.

The photobase generator is not specifically limited so long as it generates an amine directly or indirectly with light irradiation. The photobase generator includes for example bis[[(2-nitrobenzyl)oxy]carbonylhexane-1,6-diamine], nitrobenzyl cyclohexyl carbamate, di(methoxybenzyl) hexamethylene dicarbamate and the compounds of the general formula:
$(R^5—NR^6)_x—R^7$, where $R^5$ is a photoactive group including benzyloxy groups and formal groups, $R^6$ is a hydrogen or alkyl group, $R^7$ is polyvalent alkyl or aryl group, and x is at least 1. It will be understood that the formula represents an amine photobase generator wherein the polyamine liberated by photolysis is of the formula $(HNR^6)_x—R^7$.

Preparation of photobase generator compounds is known in the art. See J. Cameron et al., J. Am. Chem. Soc., vol. 113, no. 11, 4303-4313 (1991); J. Cameron et al., J. Polym. Mater. Sci. Eng., 64, 55 (1991); and J. Cameron, et al., J. Org. Chem., 55, 5919-5922 (1990), and U.S. Pat. No. 5,650,261 (Winkel), incorporated herein by reference.

Photobase generators are further described in M. Shirai et al. Photochemical Reactions of Quatemary Ammonium Dithiocarbamates as *Photobase Generators and Their Use in The Photoinitiated Thermal Crosslinking of Poly(gycidylmethacrylate)*, Journal of Polymer Science, Part A: Polymer Chemistry, vol. 39, pp. 1329-1341 (2001) and M. Shirai et al., "Photoacid and photobase generators: chemistry and applications to polymeric materials", Progress in Polymer Science, vol. 21, pp. 1-45, XP-002299394, 1996.

Any suitable Lewis acid or Brönsted acid catalysts may be used to catalyze epoxy crosslinking reactions. Suitable acid catalysts include, but are not limited to: strong inorganic acids such as hydrochloric acid, sulfuric acid, phosphoric acid, and the like; and organic acids such as acetic acid, para-toluene sulfonic acid, and oxalic acid. Examples of useful catalysts are Lewis acid compounds, such as $BF_3$ amine complexes, $SbF_6$ sulfonium compounds, bisarene iron complexes, and Bronsted acid compounds, such pentafluoroantimonic acid complexes The acid catalyst may be selected from photoacid generators (PAGs). On irradiation with light energy, ionic photoacid generators undergo a fragmentation reaction and release one or more molecules of Lewis or Bronsted acid that catalyze the ring opening and addition of the pendent epoxy groups to form a crosslink. Useful photoacid generators are thermally stable and do not undergo thermally induced reactions with the copolymer, and are readily dissolved or dispersed in the crosslinkable composition. Photoacid generators are known and reference may be made to K. Dietliker, Chemistry and Technology of UV and EB Formulation for Coatings, Inks and Paints, vol. III, SITA Technology Ltd., London, 1991. Further reference may be made to Kirk-Othmer Encyclopedia of Chemical Technology, 4.sup.th Edition, Supplement Volume, John Wiley and Sons, New York, year, pp 253-255.

Cations useful as the cationic portion of the ionic photoinitiators of the invention include organic onium cations, for example those described in U.S. Pat. Nos. 4,250,311, 3,708,296, 4,069,055, 4,216,288, 5,084,586, 5,124,417, 5,554,664 and such descriptions incorporated herein by reference, including aliphatic or aromatic Group IVA VIIA (CAS version) centered onium salts, preferably I-, S-, P-, Se- N- and C-centered onium salts, such as those selected from, sulfoxonium, iodonium, sulfonium, selenonium, pyridinium, carbonium and phosphonium, and most preferably I-, and S-centered onium salts, such as those selected from sulfoxonium, diaryliodonium, triarylsulfonium, diarylalkylsulfonium, dialkylarylsulfonium, and trialkylsulfonium.

The nature of the counteranion in an ionic PAG can influence the rate and extent of cationic addition polymerization of the epoxy groups. For example, J. V. Crivello and R. Narayan, Chem. Mater., 4, 692, (1992), report that the order of reactivity among commonly used nucleophilic anions is $^-SbF_6^- > ^-AsF_6^- > ^-PF_6^- > ^-BF_4^-$. The influence of the anion on reactivity has been ascribed to three principle factors: (1) the acidity of the protonic or Lewis acid generated, (2) the degree of ion-pair separation in the propagating cationic chain and (3) the susceptibility of the anions to fluoride abstraction and consequent chain termination. $^-B(C_6F_5)_4$ may also be used.

Useful onium salts include diazonium salts, such as aryl diazonium salts; halonium salts, such as diarlyiodonium salts; sulfonium salts, such as triarylsulfonium salts; selenonium salts, such as triarylselenonium salts; sulfoxonium salts, such as triarylsulfoxonium salts; and other miscellaneous classes of onium salts such as triaryl phosphonium and arsonium salts, and pyrylium and thiopyrylium salts.

Useful ionic photoacid generators include bis(4-t-butylphenyl) iodonium hexafluoroantimonate (FP5034™ from Hampford Research Inc., Stratford, Conn.), a mixture of triarylsulfonium salts (diphenyl(4-phenylthio) phenylsulfonium hexafluoroantimonate, bis(4-(diphenylsulfonio)phenyl)sulfide hexafluoroantimonate) available as Syna P1-6976.™. from Synasia Metuchen, N.J., (4-methoxyphenyl)phenyl iodonium triflate, bis(4-tert-butylphenyl) iodonium camphorsulfonate, bis(4-tert-butylphenyl) iodonium hexafluoroantimonate, bis(4-tert-butylphenyl) iodonium hexafluorophosphate, bis(4-tert-butylphenyl) iodonium tetraphenylborate, bis(4-tert-butylphenyl) iodonium tosylate, bis(4-tert-butylphenyl) iodonium triflate, ([4-(octyloxy)phenyl]phenyliodonium hexafluorophosphate), ([4-(octyloxy) phenyl]phenyliodonium hexafluoroantimonate), (4-isopropylphenyl)(4-methylphenyl)iodonium tetrakis (pentafluorophenyl) borate (available s Rhodorsil 2074™ from Bluestar Silicones, East Brunswick, N.J.), bis(4-methylphenyl) iodonium hexafluorophosphate (available as Omnicat 440™ from IGM Resins Bartlett, Ill.), 4-(2-hydroxy-1-tetradecycloxy)phenyl]phenyl iodonium hexafluoroantimonate, triphenyl sulfonium hexafluoroantimonate (available as CT-548™ from Chitec Technology Corp. Taipei, Taiwan), diphenyl(4-phenylthio)phenylsulfonium hexafluorophosphate, bis(4-(diphenylsulfonio)phenyl)sulfide bis(hexafluorophosphate), diphenyl(4-phenylthio)phenylsulfonium hexafluoroantimonate, bis(4-(diphenyl sulfonio)phenyl)sulfide hexafluoroantimonate, and blends of these triarylsulfonium salts available from Synasia, Metuchen, N.J. under the trade designations of Syna PI-6992™ and Syna PI-6976™ for the $PF_6$ and $SbF_6$ salts, respectively.

The use of a photobase or photoacid generator may produce residue products from the photochemical production of base. Upon exposure to actinic radiation, the photobase generator will photolyze yielding an amine and a residue compound. For example, a bis-benzyl carbamate of a diamine will photolyze to yield the diamine and a phenyl ketone as the "residue of a photobase generator". Oxime esters will yield ketones. Such residues are present in small amounts and do not normally interfere with the desired optical properties of the resulting polarizer. The residues may be detected by conventional analytical techniques, such as infrared, ultraviolet and NMR spectroscopy, gas or liquid chromatography, mass spectroscopy, or a combination of such techniques. Thus, the present invention may comprise cured thiol-epoxy matrix copolymer and detectable amounts of residues from a photobase/acid generator.

Generally the catalyst for the epoxy resin is used in amounts of at least about 0.05 wt-%, more preferably at least about 0.1 wt-%, in the range of from about 0.1 wt-% to about 5 wt-% or, more preferably, in the range of from about 0.5 wt-% to about 2 wt-%, based on the total amount of the epoxy groups and the molecular weight of the catalyst.

Figs

Referring to FIG. 1, quantum dot article 10 includes a first barrier layer 32, a second barrier layer 34, and a quantum dot layer 20 between the first barrier layer 32 and the second barrier layer 34. The quantum dot layer 20 includes a plurality of quantum dots 22 dispersed in a matrix 24.

The barrier layers 32, 34 can be formed of any useful material that can protect the quantum dots 22 from exposure to environmental contaminates such as, for example, oxygen, water, and water vapor. Suitable barrier layers 32, 34 include, but are not limited to, films of polymers, glass and dielectric materials. In some embodiments, suitable materials for the barrier layers 32, 34 include, for example, glass and polymers such as polyethylene terephthalate (PET), PEN, polyethers, or PMMA; oxides such as silicon oxide, titanium oxide, or aluminum oxide (e.g., $SiO_2$, $Si_2O_3$, $TiO_2$, or $Al_2O_3$); and suitable combinations thereof. The barrier layers are desirable at least 90%, preferably at least 95%, transmissive to the selected wavelength of incident and emitted radiation.

More particularly, barrier films can be selected from a variety of constructions. Barrier films are typically selected such that they have oxygen and water transmission rates at a specified level as required by the application. In some embodiments, the barrier film has a water vapor transmission rate (WVTR) less than about 0.005 g/m²/day at 38° C. and 100% relative humidity; in some embodiments, less than about 0.0005 g/m²/day at 38° C. and 100% relative humidity; and in some embodiments, less than about 0.00005 g/m²/day at 38° C. and 100% relative humidity. In some embodiments, the flexible barrier film has a WVTR of less than about 0.05, 0.005, 0.0005, or 0.00005 g/m²/day at 50° C. and 100% relative humidity or even less than about 0.005, 0.0005, 0.00005 g/m²/day at 85° C. and 100% relative humidity. In some embodiments, the barrier film has an oxygen transmission rate of less than about 0.005 g/m²/day at 23° C. and 90% relative humidity; in some embodiments, less than about 0.0005 g/m²/day at 23° C. and 90% relative humidity; and in some embodiments, less than about 0.00005 g/m²/day at 23° C. and 90% relative humidity.

Exemplary useful barrier films include inorganic films prepared by atomic layer deposition, thermal evaporation, sputtering, and chemical vapor deposition. Useful barrier films are typically flexible and transparent. In some embodiments, useful barrier films comprise inorganic/organic. Flexible ultra-barrier films comprising inorganic/organic multilayers are described, for example, in U.S. Pat. No. 7,018,713 (Padiyath et al.). Such flexible ultra-barrier films may have a first polymer layer disposed on polymeric film substrate that is overcoated with two or more inorganic barrier layers separated by at least one second polymer layer. In some embodiments, the barrier film comprises one inorganic barrier layer interposed between the first polymer layer disposed on the polymeric film substrate and a second polymer layer 224.

Optionally, the barrier films comprise one or more primer layers for further improved barrier performance as well as adhesion of quantum dots layer on barrier layers. However, with the thiol-alkene matrix, primer layers are not required.

In some embodiments, each barrier layer 32, 34 of the quantum dot article 10 includes at least two sub-layers of different materials or compositions. In some embodiments, such a multi-layered barrier construction can more effectively reduce or eliminate pinhole defect alignment in the barrier layers 32, 34, providing a more effective shield against oxygen and moisture penetration into the matrix 24. The quantum dot article 10 can include any suitable material or combination of barrier materials and any suitable number of barrier layers or sub-layers on either or both sides of the quantum dot layer 20. The materials, thickness, and number of barrier layers and sub-layers will depend on the particular application, and will suitably be chosen to maximize barrier protection and brightness of the quantum dots 22 while minimizing the thickness of the quantum dot article 10. In some embodiments each barrier layer 32, 34 is itself a laminate film, such as a dual laminate film, where each barrier film layer is sufficiently thick to eliminate wrinkling in roll-to-roll or laminate manufacturing processes. In one illustrative embodiment, the barrier layers 32, 34 are polyester films (e.g., PET) having an oxide layer on an exposed surface thereof.

The quantum dot layer 20 can include one or more populations of quantum dots or quantum dot materials 22. Exemplary quantum dots or quantum dot materials 22 emit green light and red light upon down-conversion of blue primary light from a blue LED to secondary light emitted by the quantum dots. The respective portions of red, green, and blue light can be controlled to achieve a desired white point for the white light emitted by a display device incorporating the quantum dot article 10. Exemplary quantum dots 22 for use in the quantum dot articles 10 include, but are not limited to, CdSe with ZnS shells. Suitable quantum dots for use in quantum dot articles described herein include, but are not limited to, core/shell luminescent nanocrystals including CdSe/ZnS, InP/ZnS, PbSe/PbS, CdSe/CdS, CdTe/CdS or CdTe/ZnS. In exemplary embodiments, the luminescent nanocrystals include an outer ligand coating and are dispersed in a polymeric matrix. Quantum dot and quantum dot materials 22 are commercially available from, for example, Nanosys Inc., Milpitas, Calif. The quantum dot layer 20 can have any useful amount of quantum dots 22, and in some embodiments the quantum dot layer 20 can include from 0.1 wt % to 20 wt % quantum dots, based on the total weight of the quantum dot layer 20.

In some embodiments the quantum dots may be additionally functionalized with ligand compounds of the formula:

$$R^8—(X)_p \qquad \text{VII}$$

wherein
$R^8$ is (hetero)hydrocarbyl group having $C_2$ to $C_{30}$ carbon atoms; preferably a linear or branched alkyl of 10 to 30 carbon atoms or a polysiloxane;
p is at least one; preferably at least two
X is an electron-donating group. Preferably X is an amino group or a thiol. Such additional ligands may be added when the functionalizing with the ligands of Formula I. Generally, there are many ligand molecules per nanoparticle. The ligands are in excess of the nanocrystals to insure coverage of the QDs.

In some embodiments, the quantum dot materials can include quantum dots dispersed in a liquid carrier, which may be ligand functional or non-functional. For example, the liquid carrier can include an oil such as an amino-silicone oil. Desirably, the liquid carrier is chosen to match the transmissivity of the polymer matrix. To increase the optical path length through the quantum dot layer and improve quantum dot absorption and efficiency, the difference in the refractive indices of the carrier liquid and the polymer matrix is ≥0.05, preferably ≥0.1.

The amino-substituted silicone carrier liquid (ligand functional carrier liquid) has the following Formula VI:

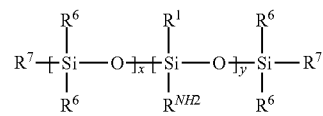

VII wherein
each $R^6$ is independently an alkyl or aryl;
$R^{NH2}$ is a n amine-substituted (hetero)hydrocarbyl group;
x is 1 to 2000; preferably 3 to 100;
y may be zero;
x+y is at least one;
$R^7$ is alkyl, aryl or $R^{NH2}$
wherein amine-functional silicone has at least two $R^{NH2}$ groups.

Useful amino-silicones, and method of making the same, are described in US 2013/0345458 (Freeman et al.), incorporated herein by reference. Useful amine-functional silicones are described in Lubkowsha et al., Aminoalkyl Functionalized Siloxanes, Polimery, 2014 59, pp 763-768, and are available from Gelest Inc, Morrisville, Pa., from Dow Corning under the Xiameter™, including Xiamter OFX-0479, OFX-8040, OFX-8166, OFX-8220, OFX-8417, OFX-8630, OFX-8803, and OFX-8822. Useful amine-functional silicones are also available from Siletech.com under the tradenames Silamine™, and from Momentive.com under the tradenames ASF3830, SF4901, Magnasoft, Magnasoft PlusTSF4709, Baysilone OF-TP3309, RPS-116, XF40-C3029 and TSF4707.

A particularly preferred aminosilicone the GP-988 available from Genesee Polymer Corp, Burton, MU having the formula:

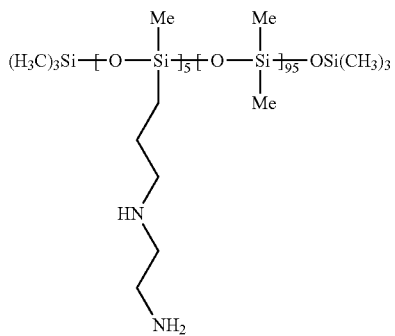

An example of a ligand system for CdSe-based quantum dots is a liquid aminosilicone type oil with both bound material and additional material of similar composition. An example of a ligand system for InP-based quantum dots is bound medium chain carboxylic acid species with a solid polymer (e.g., isobornyl methacrylate) as an additional material, or with carboxylate groups in the polymer bonded to the quantum dots as well.

In some embodiments, the ligand system can be a liquid at the time of infiltration, and subsequently converted to a solid by curing, polymerization, or solvent removal. In some embodiments the ligand system may remain liquid to provide droplets of quantum dots dispersed in a carrier liquid, in turn dispersed in a polymer matrix.

In some embodiments the amount of ligand and carrier liquid (ligand functional or non-functional) is ≥60 wt. %, preferably ≥70 wt. %, more preferably ≥80 wt. %, relative to the total including the inorganic nanoparticles. In other words, the ligand stabilized quantum dots comprise ≥60 wt. % of ligand compound of Formula VII and/or silicone of Formula VI, relative to the total weight of the stabilized quantum dots.

In one or more embodiments the quantum dot layer 20 can optionally include scattering beads or particles. These scattering beads or particles have a refractive index that differs from the refractive index of the matrix material 24 by at least 0.05, or by at least 0.1. These scattering beads or particles can include, for example, polymers such as silicone, acrylic, nylon, and the like, or inorganic materials such as $TiO_2$, $SiO_x$, $AlO_x$, and the like, and combinations thereof. In some embodiments, including scattering particles in the quantum dot layer 20 can increase the optical path length through the quantum dot layer 20 and improve quantum dot absorption and efficiency. In many embodiments, the scattering beads or particles have an average particle size from 1 to 10 micrometers, or from 2 to 6 micrometers. In some embodiments, the quantum dot material 20 can optionally include fillers such fumed silica.

In some preferred embodiments, the scattering beads or particles are inorganic beads such as Tospearl™ 120A, 130A, 145A and 2000B spherical silicone resins available in 2.0, 3.0, 4.5 and 6.0 micron particle sizes respectively from Momentive Specialty Chemicals Inc., Columbus, Ohio. Other useful scattering particles are organic beads available from Nagase America or from Sekisui Chemicals.

The matrix 24 of the quantum dot layer 20 from the thiol-alkene resin described herein that adheres to the materials forming the barrier layers 32, 34 to form a laminate construction, and also forms a protective matrix for the quantum dots 22. In one embodiment, the matrix 24 is formed by curing the thiol-alkene composition including an optional radiation-curable methacrylate compound.

Figure 2:
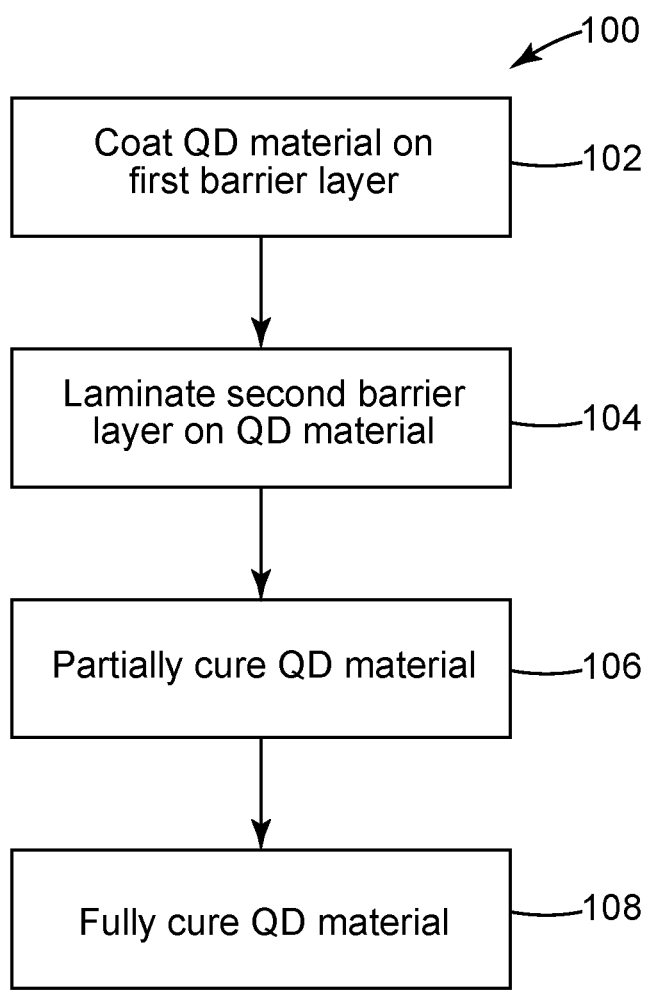
FIG. 2 is a flow diagram of an illustrative method of forming a quantum dot film.

Referring to FIG. 2, in another aspect, the present disclosure is directed to a method of forming a quantum dot film article 100 including coating a thiol-alkene composition including quantum dots on a first barrier layer 102 and disposing a second barrier layer on the quantum dot material 104. In some embodiments, the method 100 includes polymerizing (e.g., radiation curing) the radiation curable thiol-alkene to form a partially cured quantum dot material 106 and further polymerizing the binder composition to form a cured matrix 108. In some embodiments, the thiol-alkene resin may be fully cured in 106.

In some embodiments, the binder composition can be cured or hardened by heating. In other embodiments, the quantum dot composition may also be cured or hardened by applying radiation such as, for example, ultraviolet (UV) light. Curing or hardening steps may include UV curing, heating, or both. In some example embodiments that are not intended to be limiting, UV cure conditions can include applying about 10 mJ/cm$^2$ to about 4000 mJ/cm$^2$ of UVA, more preferably about 10 mJ/cm$^2$ to about 200 mJ/cm$^2$ of UVA. Heating and UV light may also be applied alone or in combination to increase the viscosity of the binder composition, which can allow easier handling on coating and processing lines.

The quantum dot composition generally has viscosity of at least 200 cPs, and up to 15,000 cPs, preferably 500 to 10,000 cPs and most preferably between 1000 and 3000 cPs. The desired coatable viscosity is achieved by selection of the associated polythiol and polyalkene.

In some embodiments, the binder composition may be cured after lamination between the overlying barrier films 32, 34. Thus, the increase in viscosity of the binder composition locks in the coating quality right after lamination. By curing right after coating or laminating, in some embodiments the cured binder increases in viscosity to a point that the binder composition acts as an adhesive to hold the laminate together during the cure and greatly reduces defects during the cure. In some embodiments, the radiation cure of the binder provides greater control over coating, curing and web handling as compared to traditional thermal curing.

Once at least partially cured, the binder composition forms polymer network that provides a protective supporting matrix 24 for the quantum dots 22.

Ingress, including edge ingress, is defined by a loss in quantum dot performance due to ingress of moisture and/or oxygen into the matrix 24. In various embodiments, the edge ingress of moisture and oxygen into the cured matrix 24 is less than about 1.0 mm after 1 week at 85° C., or about less than 0.75 mm after 1 week at 85° C., or less than about 0.5 mm after 1 week at 85° C. or less than 0.25 mm after 1 week at 85° C. In various embodiments the matrix has a moisture and oxygen ingress of less than about 0.5 mm after 500 hours at 65° C. and 95% relative humidity.

In various embodiments, oxygen permeation into the cured matrix is less than about 80 (cc·mil)/(m$^2$day), or less than about 50 (cc·mil)/(m²day). In various embodiments, the water vapor transmission rate of the cured matrix should be less than about 15 (20 g/m²·mil·day), or less than about 10 (20 g/m²·mil·day). In various embodiments, the color change observed upon aging is defined by a change of less than 0.02 on the 1931 CIE (x,y) Chromaticity coordinate system following an aging period of 1 week at 85° C. In certain embodiments, the color change upon aging is less than 0.005 on the following an aging period of 1 week at 85° C. In certain embodiments the matrix has a color shift d(x,y) using the CIE1931 (x,y) convention of less than about 0.02 after 100 hours at 65° C. and 95% relative humidity.

The thiol-epoxy matrix has a transmissivity of at least 85%, preferably at least 90%, more preferably at least 95%, in the spectral region of incident radiation, typically region of 450±50 nm. Further, the thiol-epoxy matrix has an average transmissivity of at least 85%, preferably at least 90%, more preferably at least 95%, in the visible region of 450 to 750 nm.

In various embodiments, the thickness of the quantum dot layer 20 is about 25-500 microns, generally 40 to about 250 microns.

Figure 3:
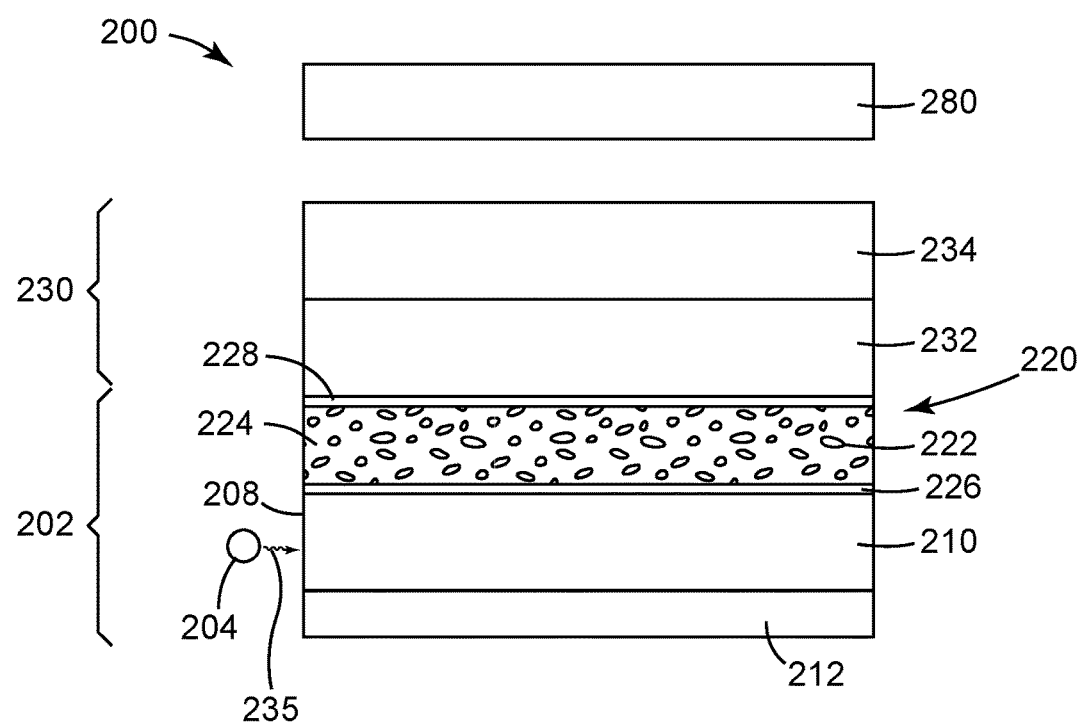
FIG. 3 is a schematic illustration of an embodiment of a display including a quantum dot article.

The quantum efficiency of the dots in the thiol-alkene-epoxy matrix is considerably higher than the quantum efficiency in conventional matrix systems, and can approach the quantum yield of the dots in dilute solution. The quantum dot article can achieve an external quantum efficiency (EQE) >85%, preferably >90% as measured by a Hamamatsu™ Quantarus using Nanosys supplied quantum dots. See http://www.hamamatsu.com/us/en/product/alpha/P/5033/index.html FIG. 3 is a schematic illustration of an embodiment of a display device 200 including the quantum dot articles described herein. This illustration is merely provided as an example and is not intended to be limiting. The display device 200 includes a backlight 202 with a light source 204 such as, for example, a light emitting diode (LED). The light source 204 emits light along an emission axis 235. The light source 204 (for example, a LED light source) emits light through an input edge 208 into a hollow light recycling cavity 210 having a back reflector 212 thereon. The back reflector 212 can be predominately specular, diffuse or a combination thereof, and is preferably highly reflective. The backlight 202 further includes a quantum dot article 220, which includes a protective matrix 224 having dispersed therein quantum dots 222. The protective matrix 224 is bounded on both surfaces by polymeric barrier films 226, 228, which may include a single layer or multiple layers.

The display device 200 further includes a front reflector 230 that includes multiple directional recycling films or layers, which are optical films with a surface structure that redirects off-axis light in a direction closer to the axis of the display, which can increase the amount of light propagating on-axis through the display device, this increasing the brightness and contrast of the image seen by a viewer. The front reflector 230 can also include other types of optical films such as polarizers. In one non-limiting example, the front reflector 230 can include one or more prismatic films 232 and/or gain diffusers. The prismatic films 232 may have prisms elongated along an axis, which may be oriented parallel or perpendicular to an emission axis 235 of the light source 204. In some embodiments, the prism axes of the prismatic films may be crossed. The front reflector 230 may further include one or more polarizing films 234, which may include multilayer optical polarizing films, diffusely reflecting polarizing films, and the like. The light emitted by the front reflector 230 enters a liquid crystal (LC) panel 280. Numerous examples of backlighting structures and films may be found in, for example, U.S. Pat. No. 8,848,132 (Epstein et al.).

EXAMPLES

Materials

| Designation | Description | Source |
|---|---|---|
| S4-p | Pentaerythritol tetra (3-mercaptopropionate), [C(CH₂OC(O)CH₂CH₂SH)₄], CAS#7575-23-7, MW = 488.66]. | TCI America, Portland, OR. |

-continued

| Designation | Description | Source |
|---|---|---|
| S4-b | Pentaerythritol tetrakis (3-mercaptobutylate), (CAS#31775-89-0, MW = 544.8), under trade designation "KARENZ MT PE1". | Showa-Denko America, Inc., New York, NY. |
| S3 | Tris[2-(3-mercaptopropionyloxy)ethyl] Isocyanurate, [CAS#36196-44-8, MW = 525.62 (EW = 175.206)]. | Bruno Bock Chemische Fabrik GmbH & Co. KG, Marschacht, Germany. |
| BPADGE | Bisphenol A diglycidyl ether (CAS#1675-54-3, MW = 340.42; Lot#H26Z052). | Alfa-Aesar, Ward Hill, MA. |
| Catalyst | 2-(dimethylamino)ethanol (CAS#108-01-0, MW = 89.14 ; Lot#L08T008). | |
| $SiO_2$ | Micro-fine silicone resins (2 mm), particle size is finely controlled for optimum consistency). | Momentive Performance Materials Inc., Waterford, NY, under trade designation "TOSPEARL 120". |
| QD-1 | Green CdSe quantum dots stabilized with amine-functionalized silicone (Lot# QCG 101713-24). | Nanosys, Inc., Milpitas, CA. |
| QD-2 | Green CdSe quantum dots stabilized with amine-functionalized silicone (Part# QCEF53040R2-01). | |
| QD-3 | Red CdSe quantum dots stabilized with amine-functionalized silicone (Part#QCEF62290R2-01). | |

Methods
Method for Thermal Analysis

Thermal analyses were carried out using a Q200 Differential Scanning calorimeter (TA Instruments, New Castle, Del.). Differential Scanning calorimeter (DSC) scans were carried out from −75° C. to 150° C. at heating rate of 3° C./min. Glass transition temperature (Tg) was determined.

Method for Measuring Quantum Yield (QY)

All quantum yields (EQE) were measured by using an absolute PL Quantum Yield Spectrometer C11347 (Hamamatsu Corporation, Middlesex, N.J.).

Method for Aging Studies

The aging study was conducted by sitting the cut films prepared in the Examples below in 85° C. oven for 7 days, then EQE and edge ingress were measured for assessing the aging stability.

Method for Determining Edge Ingress

The edge ingress of the cured matrix with two barrier films was measured from a cut edge of a matrix film by a ruler under a magnifier after it was aged as described above. The quantum dots at the edge exhibited a black-line under a blue light if the quantum dots were degraded by oxygen and/or moisture during the aging and were not emitting green and/or red light. The edge ingress number indicates how deep the quantum dots from the cut edge has been degraded.

Preparation of S4-p:BPADGE Polythiol Oligomer (PSO)

In a 125 ml amber glass bottle, 1.50 g BPADGE (8.8 eq epoxy), 8.37 g S4-p (68.5 eq SH) and 0.10 g catalyst were charged. The mixture was rolled at room temperature overnight to give a higher viscosity polythiol oligomer. The obtained higher viscosity polythiol was formulated with extra BPADGE (10.13 g, 59.5 eq epoxy) for having the equivalent ratio of —SH and epoxy=1 to 1 for QDEF matrix formulation of EX4 described below.

Preparation of S4-p:BPADGE Polyepoxy Oligomer (PEO)

In a 125 ml amber glass bottle, 11.63 g BPADGE (68.3 eq epoxy), 1.5 g S4-p (12.27 eq SH) and 0.10 g catalyst were charged. The mixture was rolled at room temperature overnight to give a higher viscosity polyepoxy oligomer. The obtained higher viscosity polyepoxy oligomer was formulated with extra S4 (6.87 g, 56.2 eq S H) for having the equivalent ratio of —SH and epoxy=1 to 1 for QDEF matrix formulation of EX9 described below.

Examples 1-9 (EX1-EX-9) and Comparative Example 1 (CE1)

About 20 g of EX1-EX9 matrix coating formulations were prepared by mixing a polythiol and a polyepoxide at an equivalent ratio (—SH to epoxide) of 1:1, and then adding either 1.5 g of a green QD (QD-1 or QD-2) or a mixture of a green QD (1.2 g of QD1 or QD2) and red QD (0.3 g of QD-3) and catalyst (0.05%, ~0.1 g) which was fully mixed using a Cowles blade mixer at the speed of 1400 rpm for 2 minutes in a nitrogen box. Note that EX3 and EX7 were repeats of EX2 and EX6, respectively. EX5 matrix coating formulation was prepared in the same manner as the other Examples except that about 5% of $SiO_2$ was added to the mixture. The types of polythiol and polyepoxide as well as the quantum dots used were varied as summarized in Table 1, below.

CE1 was "3M QUANTUM DOT ENHANCEMENT FILM" (3MQDEF360d Q38.27×3(.27,.26) with 5 mil PET film) with mixed green and red quantum dots dispersed in epoxy-amine/acrylate matrixes and cured by UV and thermal process, available from 3M Company, Saint Paul, Minn. as N10607-004.

The above prepared EX1-EX9 formulations were knife-coated between two release films (SILPHAN S 36 M, 1R 10003 Clear 152 m, obtained from Siliconature S.P.A., Chicago Ill.) at a thickness of about 100 μm and thermal curing in an 110° C. oven for 5 minutes. The coated and cured films were used for thermal analysis after removing the release films as described above.

Then, the above prepared EX1-EX9 formulations were knife-coated between two 2-mils (50 μm) thick primed PET barrier films (FTB3-M-50, available from 3M Company, St. Paul, Minn. under trade designation "3M FTB3 BARRIER FILM") at a thickness of about 100 μm and thermal curing in an 110° C. oven for 5 minutes. The cured film is used for quantum yield measurements and aging studies.

The resulting matrix films were evaluated for thermal analysis, quantum yield measurements, and edge ingress using test methods described above. The quantum yield measurements were carried on as prepared samples (i.e., before aging) and after subjecting them to an aging stability test as described above (i.e., after aging).

Table 2, below, summarizes the Tg, and QY data (EQE %, Abs %) for as prepared samples and QY data (EQE %, Abs %, AFQE) and Edge Ingress for the same samples after aging for EX1-EX9 and CE1.

TABLE 1

| Example | Matrix Formulation (Equivalent ratio) | Quantum Dot |
|---|---|---|
| EX1 | S4-p/BPADGE | QD-2 |
| EX2 | S4-p/BPADGE | QD-1 |
| EX3 | S4-p/BPADGE (Repeat) | QD-1 |
| EX4 | PSO/BPADGE | QD-2 |
| EX5 | S4-p/BPADGE/$SiO_2$ (4%) | QD-2/3 |
| EX6 | S4-b/BPADGE | QD-1/3 |
| EX7 | S4-b/BPADGE (Repeat) | QD-1/3 |
| EX8 | S3/BPADGE | QD-2/3 |
| EX9 | S4-p/PEO | QD-2 |
| CE1 | 3M QDEF with epoxy-amine/acrylate matrix | QD-1/3 |

TABLE 2

| | Before Aging | | | After Aging | | | Edge |
|---|---|---|---|---|---|---|---|
| Example | Tg | EQE % | Abs % | EQE % | Abs % | ΔEQE | Ingress (mm) |
| EX1 | 47.8 | 92.5 | 60.2 | 87 | 62.7 | −5.9% | <0.25 mm |
| EX2 | 47.5 | 90.0 | 58.2 | 94.3 | 55.1 | −3.3% | <0.25 mm |
| EX3 | N/A* | 93.5 | 60.5 | 91.1 | 58.9 | −2.6% | <0.25 mm |
| EX4 | 46.7 | 90.7 | 59.6 | 87 | 61.2 | −4.1% | <0.25 mm |
| EX5 | 48.4 | 91.4 | 52.2 | 84.8 | 43.1 | −7.2% | ~0.25 mm |
| EX6 | N/A* | 90.7 | 60.1 | 90.7 | 60.1 | −0% | <0.25 mm |
| EX7 | N/A* | 90.3 | 63.2 | 90.3 | 63.2 | −0% | <0.25 mm |
| EX8 | 41.8 | 93.1 | 57.2 | 91.7 | 53.6 | −1.5% | <0.25 mm |
| EX9 | N/A* | 90.5 | 58.4 | 89.8 | 56.8 | −0.8% | <0.25 mm |
| CE1 | 40 | 77.4 | 40.9 | 74.3 | 41.5 | −4.0% | 0.75 mm |

*N/A means not measured

What is claimed is:

1. A composition comprising quantum dots dispersed in a thiol-epoxy resin matrix comprising a (meth)acrylate component;
wherein the thiol-epoxy resin is derived from at least one polythiol, and at least one polyepoxy resin, each has a functionality ≥2, and the stoichiometric molar ratio of thiol groups of the polythiol to the epoxy groups of the polyepoxy resin is from 0.75:1 to 1:0.75;

wherein the (meth)acrylate component comprises up to 25 wt. % of the thiol-epoxy resin matrix, and the sum of the molar equivalent of the (meth)acrylate groups of the (meth)acrylate component plus the molar equivalent of the epoxy groups of the polyepoxy resin, is equal to the molar equivalent of the thiol groups of the polythiol+/−20%;

wherein the thiol-epoxy resin matrix consists essentially of a cured reaction product of the polythiol with the polyepoxy resin and the (meth)acrylate component;

wherein the quantum dots are core-shelled quantum dots selected from CdSe/CdS, CdSe/ZnS, CdTe/ZnS, PbSe/PbS, PbSe/ZnS and InP/ZnS; and wherein the quantum dots dispersed in the thiol-epoxy resin matrix achieve an external quantum efficiency (EQE) of greater than 85%.

2. The composition of claim 1 wherein the polythiol is of the formula: $R^2(SH)_y$, where $R^2$ is (hetero)hydrocarbyl group having a valence of y, and y is $\geq 2$.

3. The composition of claim 1 wherein said polythiol is obtained by esterification of a polyol with a terminally thiol-substituted carboxylic acid.

4. The composition of claim 1 wherein the polyepoxy resin is a glycidyl ether of the formula:

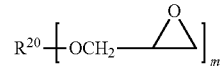

wherein
$R^{20}$ is a (hetero)hydrocarbyl radical and m is 2 to 6.

5. The composition of claim 1 wherein the quantum dots are core-shelled quantum dots stabilized by organic ligands.

6. The composition of claim 5 wherein the quantum dots are selected from CdSe/ZnS and InP/ZnS.

7. The composition of claim 1, wherein the weight ratio of quantum dots in thiol-epoxy matrix is 0.1% to 20%.

* * * * *